United States Patent
Kato et al.

(10) Patent No.: US 10,040,442 B2
(45) Date of Patent: Aug. 7, 2018

(54) HYBRID VEHICLE

(71) Applicant: Toyota Jidosha Kabushiki Kaisha, Toyota-shi, Aichi-ken (JP)

(72) Inventors: Shunya Kato, Seto (JP); Masaya Sugai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/591,822

(22) Filed: May 10, 2017

(65) Prior Publication Data

US 2017/0334425 A1 Nov. 23, 2017

(30) Foreign Application Priority Data

May 18, 2016 (JP) .................................. 2016-099385

(51) Int. Cl.
*B60L 9/00* (2006.01)
*B60W 20/10* (2016.01)
(Continued)

(52) U.S. Cl.
CPC .............. *B60W 20/10* (2013.01); *B60K 6/26* (2013.01); *B60K 6/365* (2013.01); *B60K 6/40* (2013.01);
(Continued)

(58) Field of Classification Search
CPC ...... B60W 20/10; B60W 10/06; B60W 10/08; B60W 2510/0676; B60W 2510/1005;
(Continued)

(56) References Cited

U.S. PATENT DOCUMENTS

2006/0161328 A1\* 7/2006 Hoshiba ................. B60K 6/365
701/84
2008/0289889 A1\* 11/2008 Hashimoto ............ B60K 6/445
180/65.265

(Continued)

FOREIGN PATENT DOCUMENTS

JP  2006-315664 A  11/2006
JP  2008-074328 A   4/2008

(Continued)

OTHER PUBLICATIONS

U.S. Appl. No. 15/450,196, filed Mar. 6, 2017 Inventors: Shunya Kato, Ikuo Ando, Naoki Ishikawa, Tooru Matsubara, Munehiro Katsumata, Masaya Sugai.

*Primary Examiner* — Shardul D Patel
(74) *Attorney, Agent, or Firm* — Dinsmore & Shohl LLP

(57) ABSTRACT

A hybrid vehicle includes an electronic control unit configured to: set a target rotation speed of an engine based on a vehicle speed and a shift position; set a driving force when an upper-limit power is output to a drive shaft as an upper-limit driving force; set a target engine power such that the smaller of the upper-limit driving force and the required driving force is output to the drive shaft; and control the engine, the first motor, and the second motor such that the engine to rotate at the target rotation speed and to output the target power. At this time, the upper-limit power is set to be lower when a coolant temperature of the engine is low than when the coolant temperature is high.

7 Claims, 12 Drawing Sheets

(51) Int. Cl.
*B60K 6/26* (2007.10)
*B60K 6/365* (2007.10)
*B60K 6/40* (2007.10)
*B60K 6/44* (2007.10)
*B60K 6/543* (2007.10)
*B60K 6/547* (2007.10)
*B60W 10/06* (2006.01)
*B60W 10/08* (2006.01)
*F16H 3/72* (2006.01)

(52) U.S. Cl.
CPC ............. *B60K 6/44* (2013.01); *B60K 6/543* (2013.01); *B60K 6/547* (2013.01); *B60W 10/06* (2013.01); *B60W 10/08* (2013.01); *F16H 3/725* (2013.01); *B60W 2510/0676* (2013.01); *B60W 2510/1005* (2013.01); *B60W 2520/10* (2013.01); *B60W 2540/10* (2013.01); *B60W 2540/16* (2013.01); *B60W 2710/0644* (2013.01); *B60W 2710/0677* (2013.01); *B60Y 2200/92* (2013.01); *Y10S 903/91* (2013.01); *Y10S 903/918* (2013.01); *Y10S 903/919* (2013.01); *Y10S 903/93* (2013.01)

(58) Field of Classification Search
CPC ......... B60W 2520/10; B60W 2540/10; B60W 2540/16; B60W 2710/0644; B60W 2710/0677; B60K 6/26; B60K 6/365; B60K 6/40; B60K 6/44; B60K 6/543; B60K 6/547; F16H 3/725; B60Y 2200/92; Y10S 903/91; Y10S 903/918; Y10S 903/919; Y10S 903/93
USPC ....... 701/22, 84; 180/65.265, 65.28, 65.285; 903/930
See application file for complete search history.

(56) References Cited

U.S. PATENT DOCUMENTS

| | | | | |
|---|---|---|---|---|
| 2014/0081499 | A1* | 3/2014 | Ito .................... | B60K 6/445 701/22 |
| 2014/0081500 | A1* | 3/2014 | Ito .................... | B60K 6/445 701/22 |
| 2016/0325737 | A1* | 11/2016 | Yamazaki ............ | B60W 20/40 |
| 2016/0325747 | A1* | 11/2016 | Tsuruta ................ | B60W 10/06 |
| 2017/0066433 | A1* | 3/2017 | Muta .................... | B60K 6/387 |
| 2017/0066434 | A1* | 3/2017 | Kato .................... | B60W 20/14 |
| 2017/0129478 | A1* | 5/2017 | Minegishi ............ | B60W 20/50 |
| 2017/0232951 | A1* | 8/2017 | Nawata ................ | B60K 6/46 180/65.265 |

FOREIGN PATENT DOCUMENTS

| | | |
|---|---|---|
| JP | 2010-018256 A | 1/2010 |
| JP | 2013-141893 A | 7/2013 |
| JP | 2014-144659 A | 8/2014 |
| JP | 2016-060319 A | 4/2016 |

* cited by examiner

HYBRID VEHICLE

CROSS-REFERENCE TO RELATED APPLICATIONS

The present disclosure claims priority to Japanese Patent Application No. 2016-099385 filed on May 18, 2016 which is incorporated herein by reference in its entirety including the specification, drawings and abstract.

BACKGROUND

1. Technical Field

The disclosure relates to a hybrid vehicle.

2. Description of Related Art

Japanese Patent Application Publication No. 2014-144659 (JP 2014-144659 A) discloses a hybrid vehicle that includes a planetary gear mechanism of which three rotary elements are connected to an engine, a first motor, and the second motor. In the hybrid vehicle of Japanese Patent Application Publication No. 2014-144659 (JP 2014-144659 A), a rotary element, which is connected to a second motor, of a planetary gear mechanism is connected to a drive shaft connected to vehicle wheels via a stepped transmission. Driving of such a vehicle is basically controlled as follows. First, a required driving force is set on the basis of an accelerator operation amount, operated by a driver, and a vehicle speed, and the required driving force is multiplied by a rotation speed of the drive shaft to calculate the required power to be output from the engine. Then, a target rotation speed of the engine is set on the basis of the required power and an operation line of the engine in which fuel efficiency is optimal (a fuel efficiency optimal operation line). Then, the engine, the first motor, the second motor, and the stepped transmission are controlled such that the engine rotates at the target rotation speed to output the required power and the required driving force is output to the drive shaft for the hybrid vehicle to travel.

SUMMARY

In the above-mentioned hybrid vehicle, an operating point of the engine can be freely set regardless of a shift position of the stepped transmission. Accordingly, there may be cases where a change in the rotation speed of the engine does not match a change in the vehicle speed. That is, when a driver steps on an accelerator pedal, power required for the engine increases and thus the rotation speed of the engine increases immediately, but the vehicle speed may not increase rapidly. In this case, only the engine rotation speed increases rapidly before the vehicle speed increases. In general, a driver has a driving feeling that the engine rotation speed increases with the increase in the vehicle speed. Accordingly, when only the engine rotation speed increases rapidly before the vehicle speed increases, the driver may feel discomfort in terms of the driving feeling. Even when the stepped transmission shifts, the rotation speed of the engine may not change. When a driver steps on an accelerator pedal to increase the vehicle speed, the stepped transmission upshifts with the increase in vehicle speed. However, when the power required for the engine does not change between before and after the upshift, the engine operates without changing the rotation speed of the engine. In this case, since the driver generally has a feeling of a change in speed in which the rotation speed of the engine decreases due to the upshift of the stepped transmission as a driving feeling, the driver may feel discomfort in not acquiring such a feeling of a change in speed. When a driver steps on an accelerator pedal, the power required for the engine increases and thus emissions may degrade at a low coolant temperature of the engine. The discomfort feeling to the driver in terms of the driving feeling and the degradation of the emission may be occurred when a virtual speed level shift is performed in a hybrid vehicle not including a stepped transmission.

The disclosure provides a hybrid vehicle that can achieve both giving a good driving feeling to a driver and suppressing a degradation in emissions.

An aspect of the present disclosure provides a hybrid vehicle. The hybrid vehicle includes an engine, a first motor, a planetary gear mechanism, a second motor, a battery and an electronic control unit. The planetary gear mechanism includes three rotary elements. The three rotary elements are connected to three shafts respectively. The three shafts are an output shaft of the engine, a rotary shaft of the first motor, and a drive shaft connected to an axle. The second motor is configured to input and output power to and from the drive shaft. The battery is configured to exchange electric power with the first motor and the second motor. The electronic control unit is configured to set a required driving force to be output to the drive shaft based on an accelerator operation amount and a vehicle speed. The electronic control unit is configured to control the engine, the first motor, and the second motor such that the hybrid vehicle travels using the required driving force. The electronic control unit is configured to set a target rotation speed of the engine based on the vehicle speed and a shift position. The electronic control unit is configured to set a maximum power output from the engine when the engine operates at the target rotation speed as an upper-limit power. The electronic control unit is configured to set a driving force when the upper-limit power is output to the drive shaft as an upper-limit driving force. The electronic control unit is configured to set a target engine power such that the smaller of the upper-limit driving force and the required driving force is output to the drive shaft, or such that the smaller of power for outputting the upper-limit driving force to the drive shaft and power for outputting the required driving force to the drive shaft is output to the drive shaft. The electronic control unit is configured to control the engine, the first motor, and the second motor such that the hybrid vehicle travels by causing the engine to rotate at the target rotation speed and to output the target engine power. The electronic control unit is configured to set the upper-limit power to be lower when a coolant temperature of the engine is low than when the coolant temperature is high.

According to this configuration, first, the target rotation speed of the engine is set on the basis of the vehicle speed and the shift position, and the maximum power output from the engine when the engine operates at the target rotation speed is set as the upper-limit power. Specifically, the upper-limit power is set to be less when the coolant temperature of the engine is low than when the coolant temperature is high. Then, the driving force when the upper-limit power is output to the drive shaft is set as the upper-limit driving force, and the target engine power is set such that the smaller of the upper-limit driving force and the required driving force based on the accelerator operation amount and the vehicle speed or the smaller of power (upper-limit driving force×drive shaft rotation speed) for outputting the upper-limit driving force to the drive shaft and power (required driving force×drive shaft rotation speed) for outputting the required driving force to the drive shaft is output to the drive shaft. Then, the engine, the first motor, and the second motor are controlled such that the engine rotates at the target rotation speed and the target engine power is output from the engine for the hybrid vehicle to travel. Briefly speaking, the target engine power is set such that the smaller of the upper-limit driving force set in consideration of the shift position and the required driving force set not in consideration of the shift position is output to the drive shaft, that is, the target engine power based on the shift position is set, and control is performed such that the engine rotates at the target rotation speed and the target engine power is output from the engine for the hybrid vehicle to travel. Accordingly, when the driver steps on the accelerator pedal, it is possible to drive the engine at the engine rotation speed based on the vehicle speed and to give a better driving feeling to the driver in comparison with a case in which the engine rotation speed increases rapidly before the vehicle speed increases. When the shift position is changed (shifted), the target engine power based on the shift position also changes and it is thus possible to give a feeling of a change in speed to the driver. As a result, it is possible to give a better driving feeling to the driver. When the coolant temperature of the engine is relatively low, the upper-limit power is set to be less than when the coolant temperature is relatively high. Accordingly, the power output from the engine when the coolant temperature is relatively low is relatively small, and it is thus possible to suppress a degradation in emissions. As a result, it is possible to achieve both giving a good driving feeling to a driver and suppressing a degradation in emissions.

In the hybrid vehicle, the electronic control unit may be configured to perform control such that the smaller of the upper-limit driving force and the required driving force is output to the drive shaft to allow the hybrid vehicle to travel. According to this configuration, it is possible to output a driving force suitable for the target engine power to the drive shaft to allow the hybrid vehicle to travel.

In the hybrid vehicle, the upper-limit power may include a first limit power and a second limit power. The first limit power may be the upper-limit power obtained by applying the target rotation speed to a first relationship. The first relationship may be a relationship between the target rotation speed and the upper-limit power. The second limit power is the upper-limit power obtained by applying the target rotation speed to a second relationship. The second relationship is a relationship between the target rotation speed and the upper-limit power such that the power in the second relationship is higher than the power in the first relationship. The electronic control unit may be configured to set the upper-limit power to be lower when the coolant temperature is low than when the coolant temperature is high between the first limit power and the second limit power. According to this configuration, it is possible to suppress degradation in emissions on the basis of the coolant temperature of the engine between the first limit power and the second limit power. Here, the "first relationship" refers to a relationship between the target rotation speed and the upper-limit power in which fuel efficiency of the engine is optimal, and the "second relationship" refers to a relationship between the target rotation speed and the upper-limit power in which the output power of the engine is a maximum. In the hybrid vehicle, the electronic control unit may be configured to set a coefficient to be lower when the coolant temperature is low than when the coolant temperature high. The electronic control unit may be configured to set the upper-limit power to a value obtained by adding a value, which is obtained by multiplying a difference between the second limit power and the first limit power by the coefficient, to the first limit power. According to this configuration, it is possible to suppress degradation in emissions by appropriately setting the coefficient.

In the hybrid vehicle, the electronic control unit may be configured to set the shift position based on an accelerator operation amount and the vehicle speed, and the shift position based on the driver's shifting operation. According to this configuration, the shift position can be set on the basis of the accelerator operation amount and the vehicle speed (by an automatic change in shift position) or the shift position can be set on the basis of the driver's shifting operation.

In the hybrid vehicle, the shift position may be a virtual shift position. The hybrid vehicle may further include a stepped transmission attached between the drive shaft and the planetary gear mechanism. The shift position may be one of a shift position of the stepped transmission and a shift position obtained by adding a virtual shift position to the shift position of the stepped transmission. Here, the "shift position obtained by adding a virtual shift position to the shift position of the stepped transmission" indicates that the shift positions of the stepped transmission and the virtual shift positions are combined to achieve a total of four shift positions by adding the virtual shift positions in two steps to the shift positions of the stepped transmission of two steps or to achieve total eight shift positions by adding the virtual shift positions in two steps to the shift positions of the stepped transmission in four steps. Accordingly, it is possible to utilize a desired number of shift positions.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments of the disclosure will be described below with reference to the accompanying drawings.

Figure 1:
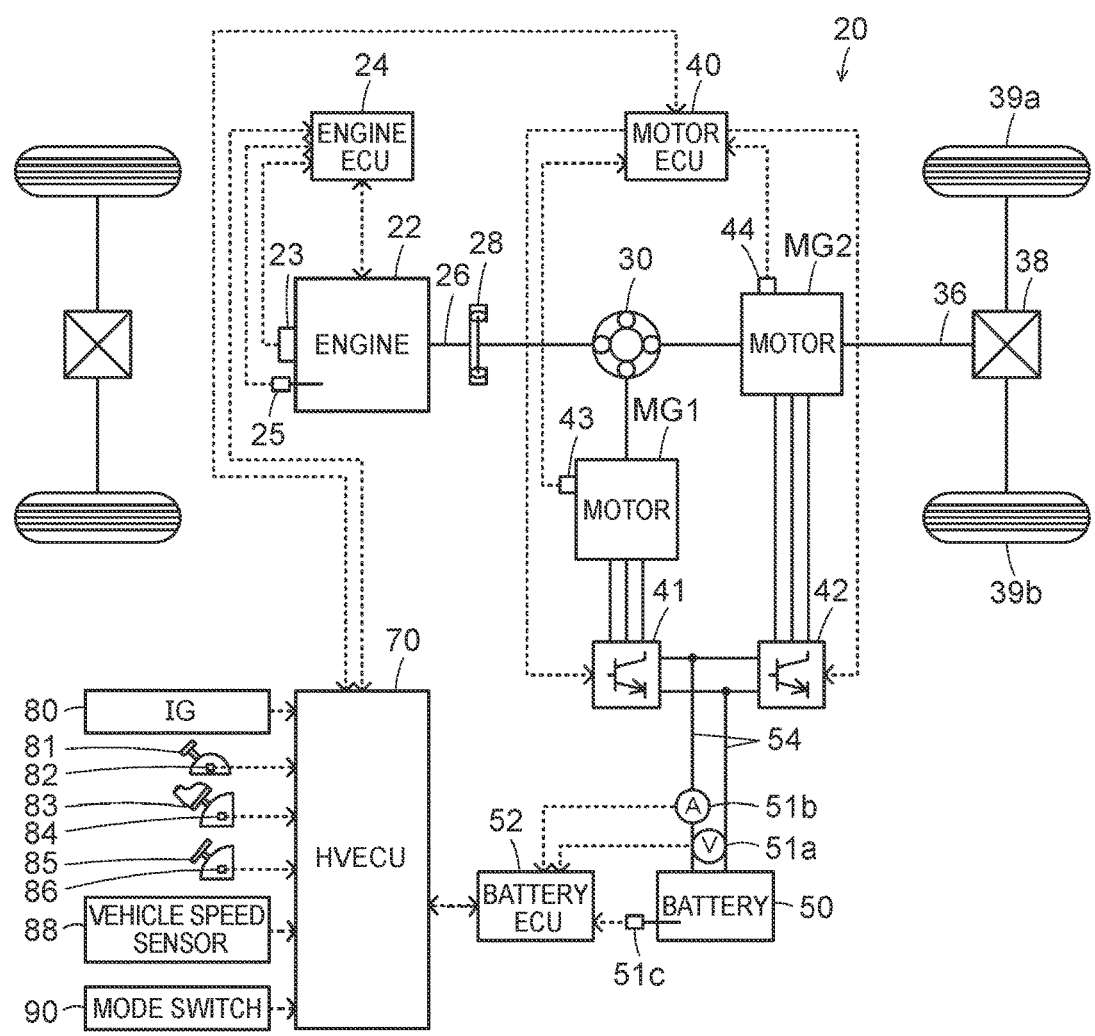
FIG. 1 is a diagram schematically illustrating a configuration of a hybrid vehicle 20 according to a first embodiment.

FIG. 1 is a diagram schematically illustrating a configuration of a hybrid vehicle 20 according to a first embodiment of the disclosure. As illustrated in the drawing, the hybrid vehicle 20 according to the first embodiment includes an engine 22, a planetary gear 30, motors MG1 and MG2, inverters 41 and 42, a battery 50, and a hybrid electronic control unit (hereinafter referred to as an "HVECU") 70.

The engine 22 is constituted by an internal combustion engine that outputs power using gasoline, diesel, or the like as fuel. Operation of the engine 22 is controlled by an engine electronic control unit (hereinafter referred to as an "engine ECU") 24.

Although not illustrated in the drawing, the engine ECU 24 is constituted by a microprocessor centered on a CPU and includes a ROM that stores a processing program, a RAM that temporarily stores data, input and output ports, and a communication port in addition to the CPU. Signals from various sensors required for controlling the operation of the engine 22 are input to the engine ECU 24 via the input port. Examples of the signals input to the engine ECU 24 include a crank angle $\theta cr$ from a crank position sensor 23 that detects a rotational position of a crank shaft 26 of the engine 22, a throttle opening level TH from a throttle valve position sensor that detects a position of a throttle valve, and a coolant temperature Tw from a water temperature sensor 25 that detects a temperature of a coolant of the engine 22. Various control signals for controlling the driving of the engine 22 are output from the engine ECU 24 via the output port. Examples of the signals output from the engine ECU 24 include a drive control signal to a throttle motor that adjusts the position of the throttle valve, a drive control signal to a fuel injection valve, and a drive control signal to an ignition coil integrated with an igniter. The engine ECU 24 is connected to the HVECU 70 via the communication port, controls driving of the engine 22 using a control signal from the HVECU 70, and outputs data on an operating state of the engine 22 to the HVECU 70 when it is necessary. The engine ECU 24 calculates a rotation speed of the crank shaft 26, that is, a rotation speed Ne of the engine 22, on the basis of a crank angle $\theta cr$ from the crank position sensor 23.

The planetary gear 30 is constituted by a single pinion type planetary gear mechanism. A rotor of the motor MG1 is connected to a sun gear of the planetary gear 30.

A drive shaft 36 connected to driving wheels 39a and 39b via a differential gear 38 is connected to a ring gear of the planetary gear 30. The crank shaft 26 of the engine 22 is connected to a carrier of the planetary gear 30 via a damper 28.

The motor MG1 is constituted, for example, by a synchronous generator-motor and the rotor thereof is connected to the sun gear of the planetary gear 30 as described above. The motor MG2 is constituted, for example, by a synchronous generator-motor and the rotor thereof is connected to the drive shaft 36. The inverters 41 and 42 are connected to the battery 50 via power lines 54. The motors MG1 and MG2 are rotationally driven by controlling switching of a plurality of switching elements, which are not illustrated, of the inverters 41 and 42 by a motor electronic control unit (hereinafter referred to as a "motor ECU") 40.

Although not illustrated in the drawing, the motor ECU 40 is constituted by a microprocessor centered on a CPU and includes a ROM that stores a processing program, a RAM that temporarily stores data, input and output ports, and a communication port in addition to the CPU. Signals from various sensors required for controlling driving of the motors MG1 and MG2 are input to the motor ECU 40 via the input port. Examples of the signals input to the motor ECU 40 include rotational positions $\theta m1$ and $\theta m2$ from rotational position sensors 43 and 44 that detect rotational positions of the rotors of the motors MG1 and MG2 and phase currents from current sensors that detect currents flowing in phases of the motors MG1 and MG2. Switching control signals to switching elements, which are not illustrated, of the inverters 41 and 42 are output from the motor ECU 40 via the output port. The motor ECU 40 is connected to the HVECU 70 via the communication port, controls driving of the motors MG1 and MG2 using a control signal from the HVECU 70, and outputs data on driving states of the motors MG1 and MG2 to the HVECU 70 when it is necessary. The motor ECU 40 calculates the rotation speeds Nm1 and Nm2 of the motors MG1 and MG2 on the basis of the rotational positions $\theta m1$ and $\theta m2$ of the rotors of the motors MG1 and MG2 from the rotational position sensors 43 and 44.

The battery 50 is constituted, for example, by a lithium ion secondary battery or a nickel hydride secondary battery and is connected to the inverters 41 and 42 via the power lines 54. The battery 50 is managed by a battery electronic control unit (hereinafter referred to as a "battery ECU") 52.

Although not illustrated in the drawing, the battery ECU 52 is constituted by a microprocessor centered on a CPU and includes a ROM that stores a processing program, a RAM that temporarily stores data, input and output ports, and a communication port in addition to the CPU. Signals from various sensors required for managing the battery 50 are input to the battery ECU 52 via the input port. Examples of the signals input to the battery ECU 52 include a battery voltage Vb from a voltage sensor 51a disposed between terminals of the battery 50, a battery current Ib from a current sensor 51b attached to an output terminal of the battery 50, and a battery temperature Tb from a temperature sensor 51c attached to the battery 50. The battery ECU 52 is connected to the HVECU 70 via the communication port and outputs data on a state of the battery 50 to the HVECU 70 when it is necessary. The battery ECU 52 calculates a power storage ratio SOC on the basis of an integrated value of the battery current Ib from the current sensor 51b. The power storage ratio SOC is a ratio of dischargeable power of the battery 50 to full capacity of the battery 50.

Although not illustrated in the drawing, the HVECU 70 is constituted by a microprocessor centered on a CPU and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80, a shift position SP from a shift position sensor 82 that detects an operating position of a shift lever 81, an accelerator operation amount Acc from an accelerator pedal position sensor 84 that detects an accelerator operation amount, which is an operation amount of an accelerator pedal 83, and a brake pedal position BP from a brake pedal position sensor 86 that detects a degree of stepping on a brake pedal 85. Examples of the input signals also include a vehicle speed V from a vehicle speed sensor 88 and a mode switching control signal from a mode switch 90. As described above, the HVECU 70 is connected to the engine ECU 24, the motor ECU 40, and the battery ECU 52 via the communication port and gives and takes various control signals or data to and from the engine ECU 24, the motor ECU 40, and the battery ECU 52.

Examples of the shift position SP include a parking position (P position), a reversing position (R position), a neutral position (N position), a driving position (D position), and a manual position (M position). The manual position (M position) is provided with an upshift position (+position) and a downshift position (−position). When the shift position SP is changed to the manual position (M position), driving of the engine 22 is controlled such that the engine 22 is connected to the drive shaft 36 via an automatic transmission of six virtual shift positions. The mode switch 90 is a switch which is used to select driving modes including a driving feeling priority mode in which fuel efficiency is slightly decreased but a driver's driving feeling (drivability or driving feeling) has priority and a normal driving mode in which fuel efficiency has priority. When the normal driving mode is selected and the shift position SP is the driving position (D position), driving of the engine 22 and the motors MG1 and MG2 are controlled such that static inertia and fuel efficiency are compatible with each other. When the driving feeling priority mode is selected and the shift position SP is the driving position (D position), driving of the engine 22 is controlled such that the engine is connected to the drive shaft 36 via the automatic transmission of six virtual shift positions.

The hybrid vehicle 20 according to the first embodiment having the above-mentioned configuration travels in any one of a plurality of driving modes including a hybrid driving (HV driving) mode and an electrical driving (EV driving) mode. Here, the HV driving mode is a mode in which the vehicle travels using power from the engine 22 and power from the motors MG1 and MG2 while operating the engine 22. The EV driving mode is a mode in which the vehicle travels using power from the motor MG2 without operating the engine 22.

Figure 2:
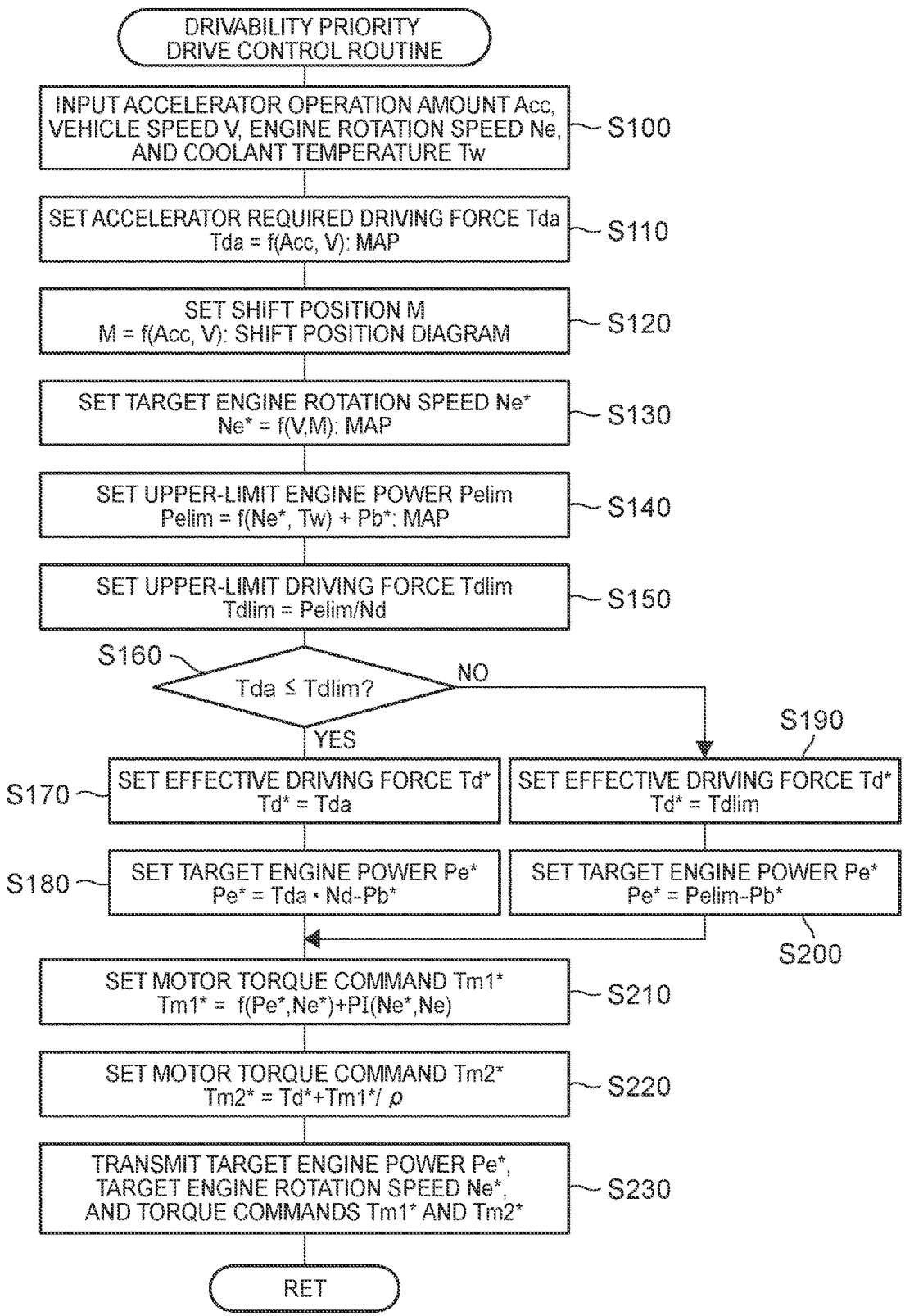
FIG. 2 is a flowchart illustrating an example of a drivability priority drive control routine which is performed by an HVECU 70 when a D position is set in a driving feeling priority mode.

The operation of the hybrid vehicle 20 having the above-mentioned configuration, particularly, the operation when a driving feeling priority mode is selected by the mode switch 90, will be described below. FIG. 2 is a flowchart illustrating an example of a drivability priority drive control routine which is performed by the HVECU 70 when the driving feeling priority mode is selected and the shift position SP upshifts to the driving position (D position). This routine is repeatedly performed at predetermined times (for example, every several msec). Before describing drive control when the D position is set in the driving feeling priority mode using the drivability priority drive control routine illustrated in FIG. 2, drive control when the D position is set in the driving feeling priority mode (drive control in the HV driving mode) will be first described for the purpose of convenience of explanation.

In the normal driving mode, when the vehicle travels in the HV driving mode, drive control is performed as follows by the HVECU 70. The HVECU 70 first calculates an accelerator required driving force Tda which is required for traveling (required for the drive shaft 36) on the basis of the accelerator operation amount Ace and the vehicle speed V and sets the accelerator required driving force Tda as an effective driving force Td*. The accelerator required driving force Tda can be calculated, for example, from an accelerator required driving force setting map illustrated in FIG. 3. Subsequently, the set effective driving force Td* is multiplied by a rotation speed Nd of the drive shaft 36 to calculate driving required power Pedry required for traveling. Here, a rotation speed obtained by multiplying the rotation speed Nm2 of the motor MG2 by a conversion factor km, a rotation speed obtained by multiplying the vehicle speed V by a conversion factor kv, or the like can be used as the rotation speed Nd of the drive shaft 36. Charging/discharging required power Pb* (which has a positive value when power is discharged from the battery 50) of the battery 50 is set such that the power storage ratio SOC of the battery 50 approaches a target ratio SOC*, and target engine power Pe* is calculated by subtracting the charging/discharging required power Pb* of the battery 50 from the driving required power Pedry as expressed by Expression (1). The charging/discharging required power Pb* is set, for example, using a charging/discharging required power setting map illustrated in FIG. 4. In the charging/discharging required power setting map, a dead zone from a value 51 to a value S2 with respect to the target ratio SOC* is provided and the charging/discharging required power Pb* is set as discharging power (power with a positive value) when the power storage ratio SOC is greater than the upper limit value S2 of the dead zone, and is set as charging power (power with a negative value) when the power storage ratio SOC is less than the lower limit value S1 of the dead zone.

$$Pe^* = Pedry - Pb^* \quad (1)$$

Figure 5:
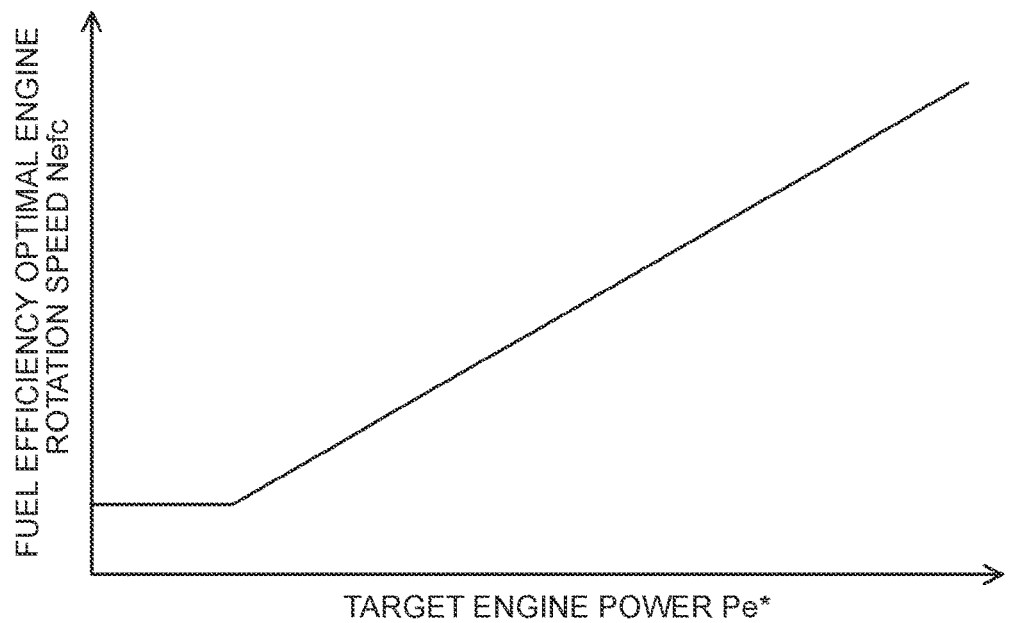
FIG. 5 is a diagram illustrating an example of a fuel efficiency optimal engine rotation speed setting map.

Then, a fuel efficiency optimal engine rotation speed Nefc is calculated using the target engine power Pe* and a fuel efficiency optimal engine rotation speed setting map, and the fuel efficiency optimal engine rotation speed Nefc is set as the target engine rotation speed Ne*. An example of the fuel efficiency optimal engine rotation speed setting map is illustrated in FIG. 5. The fuel efficiency optimal engine rotation speed setting map is determined as a relationship between the target engine power Pe* and the rotation speed at which the engine 22 can be efficiently operated by experiment or the like. Since the fuel efficiency optimal engine rotation speed Nefc basically increases as the target engine power Pe* increases, the target engine rotation speed Ne* also increases as the target engine power Pe* increases. Subsequently, as expressed by Expression (2), a torque command Tm1* of the motor MG1 is calculated using the rotation speed Ne of the engine 22, the target engine rotation speed Ne*, the target engine power Pe*, and a gear ratio p of the planetary gear 30 (the number of teeth of the sun gear/the number of teeth of the ring gear). Expression (2) is a relational expression of rotation speed feedback control for causing the engine 22 to rotate at the target engine rotation speed Ne*. In Expression (2), the first term on the right side is a feedforward term, and the second and third terms on the right side are a proportional term and an integral term of a feedback term. The first term on the right side denotes a torque which is used for the motor MG1 to receive a torque output from the engine 22 and applied to the rotary shaft of the motor MG1 via the planetary gear 30. "kp" of the second term on the right side denotes a gain of the proportional term, and "ki" of the third term on the right side denotes a gain of the integral term. Considering a case in which the engine 22 is in a substantially static state (when the target engine rotation speed Ne* and the target engine power Pe* are substantially constant), it can be seen that as the target engine power Pe* increases, the first term on the right side of Expression (2) decreases (the absolute value thereof increases), the torque command Tm1* of the motor MG1 decreases (increases to the negative side), and power of the motor MG1 (which has a positive value when power is consumed) obtained by multiplying the torque command Tm1* of the motor MG1 by the rotation speed Nm1 decreases (generated power increases).

$$Tm1^* = -(Pe^*/Ne^*) \cdot [\rho/(1+\rho)] + kp \cdot (Ne^* - Ne) + ki \cdot \int (Ne^* - Ne) dt \quad (2)$$

Then, as expressed by Expression (3), a torque command Tm2* of the motor MG2 is set by subtracting a torque (−Tm1*/ρ) output from the motor MG1 and applied to the drive shaft 36 via the planetary gear 30 when the motor MG1 is driven in accordance with the torque command Tm1* from the effective driving force Td*. The torque command Tm2* of the motor MG2 is limited to a torque limit Tm2max obtained from an output limit Wout of the battery 50 using Expression (4). As expressed by Expression (4), the torque limit Tm2max is obtained by subtracting power of the motor MG1, which is obtained by multiplying the torque command Tm1* of the motor MG1 by the rotation speed Nm1, from the output limit Wout of the battery 50 and dividing the resultant value by the rotation speed Nm2 of the motor MG2.

$$Tm2^* = Td^* + Tm1^*/\rho \quad (3)$$

$$Tm2\text{max} = (Wout - Tm1^* \cdot Nm1)/Nm2 \quad (4)$$

When the target engine power Pe*, the target engine rotation speed Ne*, and the torque commands Tm1* and Tm2* of the motors MG1 and MG2 are set in this way, the target engine power Pe* and the target engine rotation speed Ne* are transmitted to the engine ECU 24 and the torque commands Tm1* and Tm2* of the motors MG1 and MG2 are transmitted to the motor ECU 40.

When the target engine power Pe* and the target engine rotation speed Ne* are received, the engine ECU 24 performs intake air volume control, fuel injection control, ignition control, and the like of the engine 22 such that the engine 22 operates on the basis of received target engine power Pe* and the received target engine rotation speed Ne*. When the torque commands Tm1* and Tm2* of the motors MG1 and MG2 are received, the motor ECU 40 performs switching control of a plurality of switching elements of the inverters 41 and 42 such that the motors MG1 and MG2 are driven with the torque commands Tm1* and Tm2*.

When the target engine power Pe* is less than a threshold value Pref in the HV driving mode, it is determined that a stop condition of the engine 22 is satisfied and the operation of the engine 22 stops to transition to the EV driving mode.

In the EV driving mode, the HVECU 70 sets the effective driving force Td* in the same way as in the HV driving mode, sets the torque command Tm1* of the motor MG1 to a value of 0, and sets the torque command Tm2* of the motor MG2 in the same way as in the HV driving mode. The torque commands Tm1* and Tm2* of the motors MG1 and MG2 are transmitted to the motor ECU 40. Then, the motor ECU 40 performs switching control of a plurality of switching elements of the inverters 41 and 42 as described above.

In the EV driving mode, when the target engine power Pe* calculated in the same way as in the HV driving mode is equal to or greater than the threshold value Pref, it is determined that a start condition of the engine 22 is satisfied and the engine 22 starts to transition to the HV driving mode.

Drive control when the D position is set in the driving feeling priority mode will be described below with reference to the drivability priority drive control routine illustrated in FIG. 2. When the drivability priority drive control routine is performed, the HVECU 70 receives the accelerator operation amount Acc from the accelerator pedal position sensor 84, the vehicle speed V from the vehicle speed sensor 88, the rotation speed Ne of the engine 22, and the coolant temperature Tw from the water temperature sensor 25 (Step S100), and sets the accelerator required driving force Tda using the received accelerator operation amount Acc, the received vehicle speed V, and an accelerator required driving force setting map illustrated in FIG. 3 (Step S110). Here, as the rotation speed Ne of the engine 22, a value calculated on the basis of the crank angle θcr from the crank position sensor 23 can be received from the engine ECU 24 by communication. As the coolant temperature Tw, a value detected by the water temperature sensor 25 can be received from the engine ECU 24 by communication.

Figure 6:
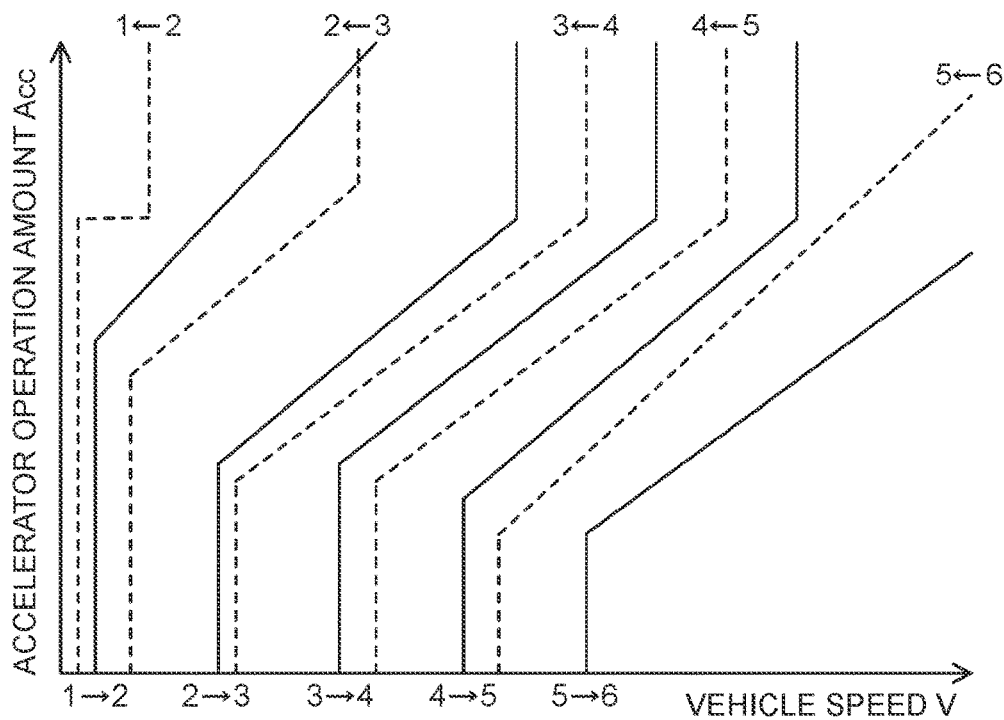
FIG. 6 is a diagram illustrating an example of a shift position diagram.
Figure 7:
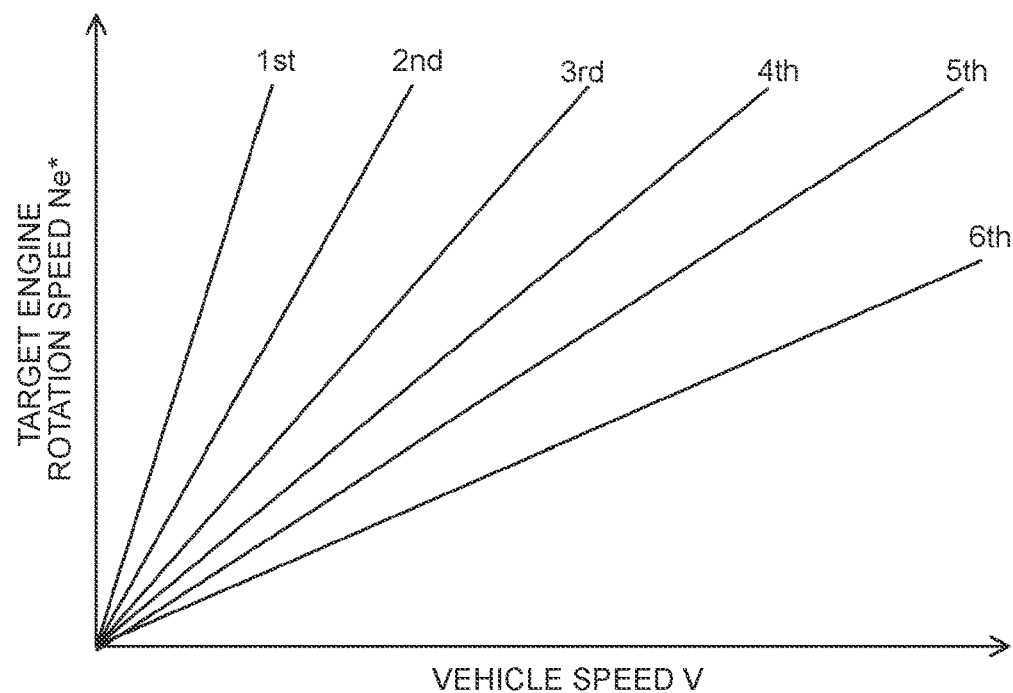
FIG. 7 is a diagram illustrating an example of a target engine rotation speed setting map.

Subsequently, the shift position M is set using the accelerator operation amount Acc, the vehicle speed V, and the shift position diagram (Step S120), and a target engine rotation speed Ne* is set using the vehicle speed V, the shift position M, and a target engine rotation speed setting map (Step S130). FIG. 6 illustrates an example of the shift position diagram. In the drawing, solid lines denote upshift lines, and dotted lines denote downshift lines. In the first embodiment, since control is performed with the automatic transmission of six virtual shift positions, the shift position diagram also corresponds to six shift positions. FIG. 7 illustrates an example of the target engine rotation speed setting map. In the target engine rotation speed setting map of the first embodiment, the target engine rotation speed Ne* is set in a linear relationship with the vehicle speed V for each shift position such that a slope with respect to the vehicle speed V decreases as the shift position increases. The reason for setting the target engine rotation speed Ne* in this way is to give a driving feeling of a vehicle equipped with an automatic transmission to a driver by increasing the rotation speed Ne of the engine 22 when the vehicle speed V increases for each shift position, or decreasing the rotation speed Ne of the engine 22 in upshifting and increasing the rotation speed Ne of the engine 22 in downshifting.

Then, the upper-limit engine power Pelim is set by adding a charging/discharging required power Pb* to a temporary upper-limit engine power Pelim which is obtained using the target engine rotation speed Ne*, the coolant temperature Tw, and an upper-limit engine power setting map (Step S140). Here, the upper-limit engine power Pelim is maximum power output from the engine 22 when the engine 22 operates at the target engine rotation speed Ne*. The temporary upper-limit engine power Pelim is set by adding a value, which is obtained by multiplying a difference between temporary upper-limit engine power Pelim in a fuel efficiency optimal line (in which the weighting factor k is 0) for the target engine rotation speed Ne* and temporary upper-limit engine power Pelim in a maximum output line (in which the weighting factor is 1) by the weighting factor k, to the temporary upper-limit engine power Pelim in the fuel efficiency optimal line (in which the weighting factor k is 0). Here, the weighting factor k is determined as a coefficient based on the coolant temperature Tw and is determined to be less when the coolant temperature Tw is relatively low than when the coolant temperature Tw is relatively high.

Figure 8:
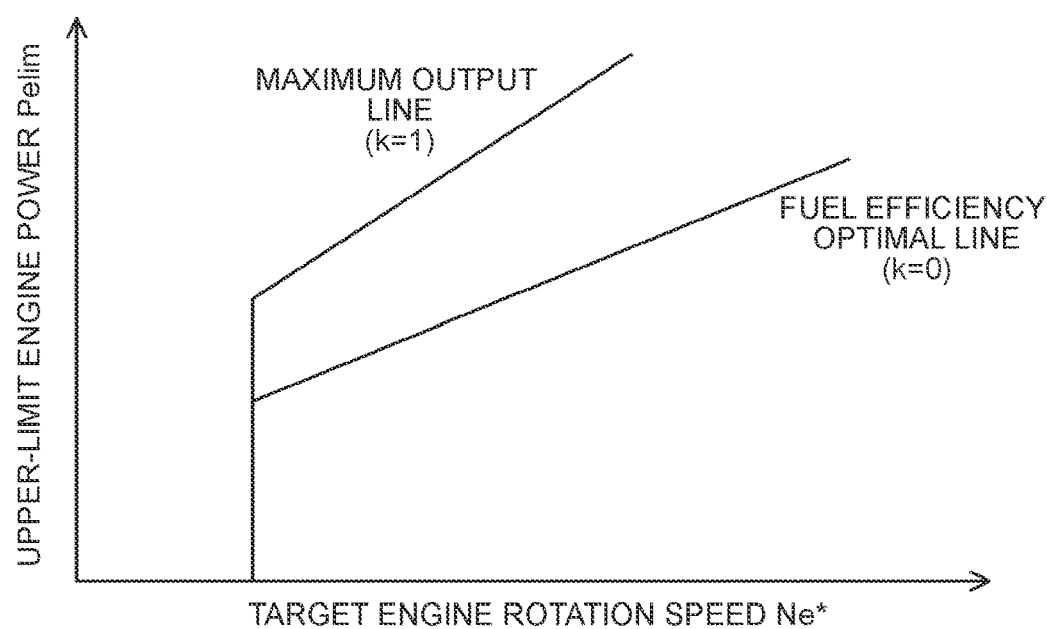
FIG. 8 is a diagram illustrating an example of an upper-limit engine power setting map.
Figure 9:
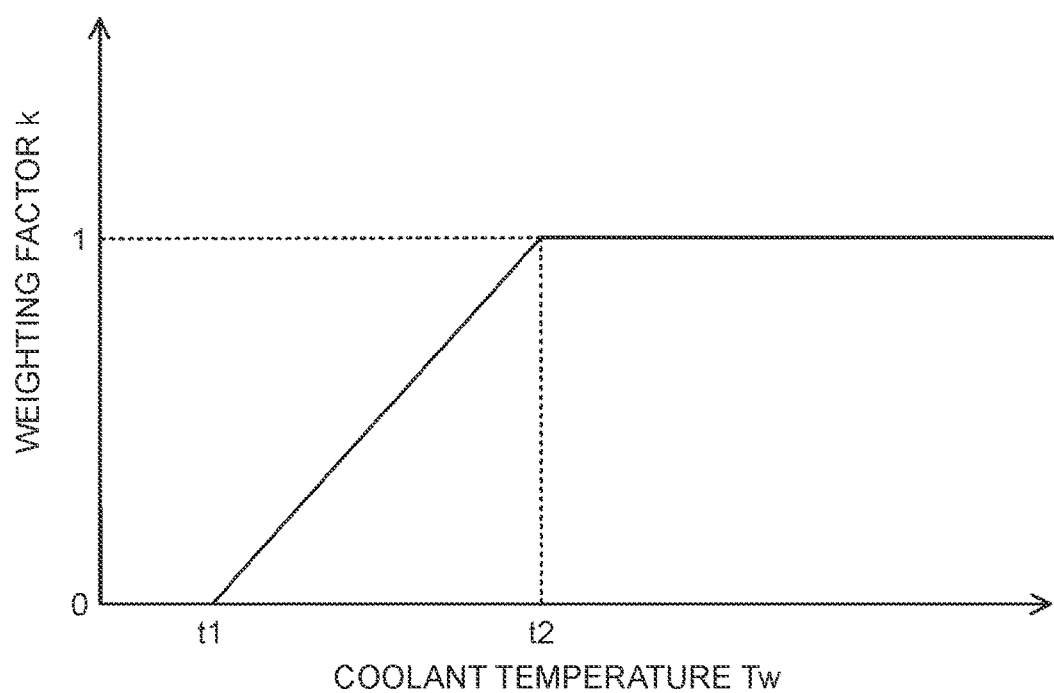
FIG. 9 is a diagram illustrating an example of a relationship between a coolant temperature Tw and a weighting factor k.

FIG. 8 illustrates an example of the upper-limit engine power setting map and FIG. 9 illustrates an example of a relationship between the coolant temperature Tw and the weighting factor k. As illustrated in FIG. 8, the relationship between the target engine rotation speed Ne* and the temporary upper-limit engine power Pelim is determined between temporary upper-limit engine power Pelim obtained by applying the target engine rotation speed Ne* to the fuel efficiency optimal line (in which the weighting factor k is 0) which is a relationship between the target engine rotation speed Ne* and the temporary upper-limit engine power Pelim in which the fuel efficiency is optimal and temporary upper-limit engine power Pelim obtained by applying the target engine rotation speed Ne* to the maximum output line (in which the weighting factor is 1) which is a relationship between the target engine rotation speed Ne* and the temporary upper-limit engine power Pelim in which the output power of the engine 22 is a maximum (maximum rated output power). As illustrated in FIG. 9, it is assumed that the weighting factor k is set to 0 when the coolant temperature Tw is equal to or lower than a temperature t1 and the weighting factor k is set to 1 when the coolant temperature Tw is higher than a temperature t2. When the coolant temperature Tw is higher than the temperature t1 and equal to or lower than the temperature t2, it is assumed that the weighting factor k is set to be greater when the coolant temperature Tw is relatively high than when the coolant temperature Tw is relatively low, specifically, to increase from 0 to 1 as the coolant temperature Tw increases. Here, the temperature t2 is determined as a temperature at which the output power of the engine 22 is allowed to be a maximum (for example, a temperature when warming-up of the engine 22 is completed) and may be set to, for example, 75° C., 80° C., 85° C., or the like. The temperature t1 is determined to be lower by a certain degree than the temperature t2 and may be set to, for example, 45° C., 50° C., 55° C., or the like.

The reason for addition of the charging/discharging required power Pb* in Step 5140 is not to change power output from the engine 22 even when the battery 50 is charged or discharged. This will be described later. When the power storage ratio SOC is in a dead zone (a range from a value S1 to a value S2 in FIG. 4) centered on a target ratio SOC*, the charging/discharging required power Pb* is set to 0 and thus the temporary upper-limit engine power Pelim obtained from the upper-limit engine power setting map is set as the upper-limit engine power Pelim. When the upper-limit engine power Pelim is set in this way, an upper-limit driving force Tdlim is set by dividing the upper-limit engine power Pelim by the rotation speed Nd of the drive shaft 36 (Step S150). As the rotation speed Nd of the drive shaft 36, a rotation speed obtained by multiplying the rotation speed Nm2 of the motor MG2 by the conversion factor km or a rotation speed obtained by multiplying the vehicle speed V by a conversion factor kv can be used as described above.

The accelerator required driving force Tda and the upper-limit driving force Tdlim are compared (Step S160). When the accelerator required driving force Tda is equal to or less than the upper-limit driving force Tdlim, the accelerator required driving force Tda is set as the effective driving force Td* (Step S170) and a value obtained by subtracting the charging/discharging required power Pb* from a value which is obtained by multiplying the accelerator required driving force Tda by the rotation speed Nd of the drive shaft 36 is set as the target engine power Pe* (Step S180), similarly to the normal driving mode. Accordingly, the target engine power Pe* can be said to be power for outputting the accelerator required driving force Tda to the drive shaft 36.

On the other hand, when the accelerator required driving force Tda is greater than the upper-limit driving force Tdlim in Step S160, the upper-limit driving force Tdlim is set as the effective driving force Td* (Step S190) and a value obtained by subtracting the charging/discharging required power Pb* from the upper-limit engine power Pelim is set as the target engine power Pe* (Step S200). Since the upper-limit engine power Pelim is set by adding the charging/discharging required power Pb* to the temporary upper-limit engine power Pelim obtained from the upper-limit engine power setting map illustrated in FIG. 6 in Step S140, setting a value obtained by subtracting the charging/discharging required power Pb* from the upper-limit engine power Pelim as the target engine power Pe* refers to setting the temporary upper-limit engine power Pelim obtained from the upper-limit engine power setting map illustrated in FIG. 8 as the target engine power Pe*. In this way, by considering the charging/discharging required power Pb*, the operation point of the engine 22 can be maintained constant regardless of charging/discharging of the battery 50. Since the upper-limit driving force Tdlim is calculated by dividing the upper-limit engine power Pelim by the rotation speed Nd of the drive shaft 36 in Step S150, the upper-limit engine power Pelim can be said to be power for outputting the upper-limit driving force Tdlim to the drive shaft 36.

Then, the torque command Tm1* of the motor MG1 is set using Expression (2) (Step S210) and the torque command Tm2* of the motor MG2 is set using Expression (3) (Step S220). The target engine power Pe* and the target engine rotation speed Ne* are transmitted to the engine ECU 24, the torque commands Tm1* and Tm2* are transmitted to the motor ECU 40 (Step S230), and the routine ends.

In this routine, when the coolant temperature Tw is relatively low, the temporary upper-limit engine power Pelim is set to be relatively small and the upper-limit driving force Tdlim is set to be relatively small. When the accelerator required driving force Tda is equal to or less than the upper-limit driving force Tdlim, the power for outputting the accelerator required driving force Tda to the drive shaft 36 is set as the target engine power Pe*. When the accelerator required driving force Tda is greater than the upper-limit driving force Tdlimm, the power for outputting the upper-limit driving force Tdlim to the drive shaft 36 is set as the target engine power Pe*. Accordingly, when the coolant temperature Tw is relatively low, the upper-limit driving force Tdlim is set to be relatively small, the smaller of the upper-limit driving force Tdlim and the accelerator required driving force Tda accelerator required driving force Tda is output to the drive shaft 36, and thus it is possible to achieve both giving a good driving feeling to the driver and to suppress a degradation in emissions.

In the above-mentioned hybrid vehicle 20 according to the first embodiment, when the shift position is the D position in the driving feeling priority mode, a shift position M is set on the basis of the accelerator operation amount Acc and the vehicle speed V, and the target engine rotation speed Ne* is set on the basis of the vehicle speed V and the shift position M. As the maximum power output from the engine 22 when the engine 22 operates at the target engine rotation speed Ne*, the upper-limit engine power Pelim is set to be less when the coolant temperature Tw is relatively low than when the coolant temperature Tw is relatively high. Subsequently, the upper-limit driving force Tdlim is set by dividing the upper-limit engine power Pelim by the rotation speed Nd of the drive shaft 36. The power for outputting the smaller of the accelerator required driving force Tda and the upper-limit driving force Tdlim to the drive shaft 36 is set as the target engine power Pe*, and the engine 22 and the motors MG1 and MG2 are controlled such that the engine 22 rotates at the target engine rotation speed Ne* and the target engine power Pe* is output from the engine 22 for the hybrid vehicle to travel. Briefly speaking, the target engine power Pe* is set such that the smaller of the accelerator required driving force Tda set not in consideration of the shift position M and the upper-limit driving force Tdlim set in consideration of the shift position M is output to the drive shaft 36, and control is performed such that the target engine power Pe* is output from the engine 22 for the hybrid vehicle to travel. Accordingly, when the driver steps on the accelerator pedal 83, it is possible to drive the engine 22 at the engine rotation speed Ne based on the vehicle speed V and to give a better driving feeling to the driver in comparison with a case in which the engine rotation speed Ne increases rapidly before the vehicle speed V increases. When the shift position M is changed (shifted), the target engine power Pe* based on the shift position M also changes and it is thus possible to give a feeling of a change in speed to the driver. As a result, it is possible to give a good driving feeling to the driver. When the coolant temperature Tw of the engine 22 is relatively low, the upper-limit power Pelim is set to be less than when the coolant temperature Tw is relatively high. Accordingly, the power output from the engine 22 when the coolant temperature Tw is relatively low is relatively small, and it is thus possible to suppress a degradation in emissions. As a result, it is possible to achieve both giving a good driving feeling to a driver and suppressing a degradation in emissions.

In the hybrid vehicle 20 according to the first embodiment, the power for outputting the smaller of the accelerator required driving force Tda and the upper-limit driving force Tdlim to the drive shaft 36 is set as the target engine power Pe*. However, the target engine power Pe* may be set such that the smaller of power obtained by multiplying the accelerator required driving force Tda by the rotation speed Nd of the drive shaft 36 (Tda×Nd) and power obtained by multiplying the upper-limit driving force Tdlim by the rotation speed Nd of the drive shaft 36 (Tdlim×Nd) is output to the drive shaft 36. That is, Step S160 can be set to a process of comparing the power obtained by multiplying the accelerator required driving force Tda by the rotation speed Nd of the drive shaft 36 (Tda×Nd) with the power obtained by multiplying the upper-limit driving force Tdlim by the rotation speed Nd of the drive shaft 36 (Tdlim×Nd).

In the hybrid vehicle 20 according to the first embodiment, the mode switch 90 is provided and the drivability priority drive control routine illustrated in FIG. 2 is performed when the driving feeling priority mode is selected by the mode switch 90, but the drivability priority drive control routine illustrated in FIG. 2 may be performed as normal drive control without providing the mode switch 90.

Figure 10:
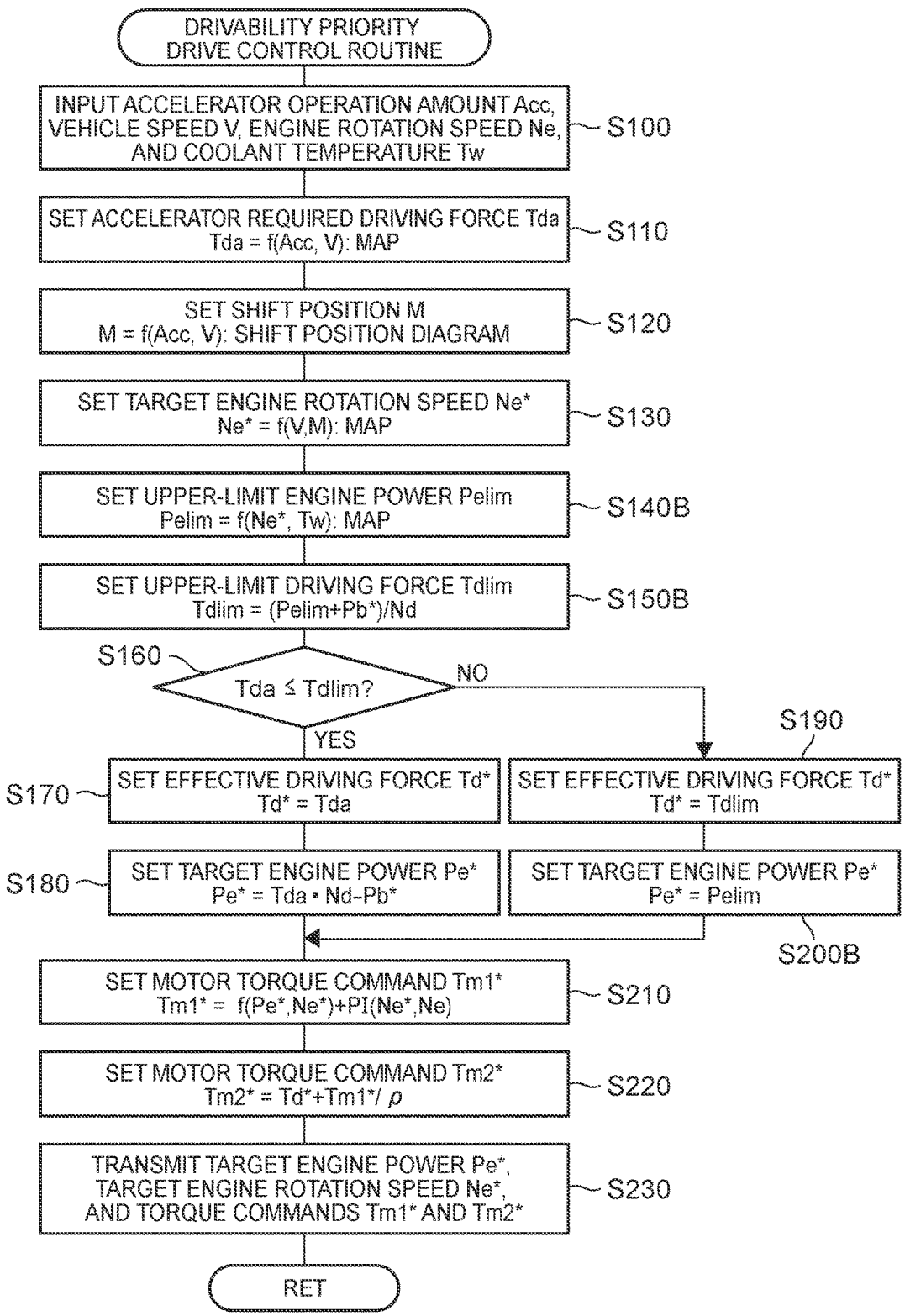
FIG. 10 is a flowchart illustrating a drivability priority drive control routine according to a modified example.

In the hybrid vehicle 20 according to the first embodiment, when the accelerator required driving force Tda is greater than the upper-limit driving force Tdlim in charging/discharging the battery 50, the upper-limit engine power Pelim is set by adding the charging/discharging required power Pb* to the temporary upper-limit engine power Pelim obtained from the upper-limit engine power setting map (Step S140), and a value obtained by subtracting the charging/discharging required power Pb* from the upper-limit engine power Pelim is set as the target engine power Pe* (Step S200). However, as described in the drivability priority drive control routine illustrated in FIG. 10, the temporary upper-limit engine power Pelim obtained by the upper-limit engine power setting map may be set as the upper-limit engine power Pelim (Step S140B), the upper-limit driving force Tdlim is set by dividing a value, which is obtained by adding the charging/discharging required power Pb* to the upper-limit engine power Pelim, by the rotation speed Nd of the drive shaft 36 (Step S150B), and the upper-limit engine power Pelim may be set as the target engine power Pe* (Step S200B). Both routines are different in only whether to consider the charging/discharging required power Pb* in calculating the upper-limit engine power Pelim or whether to consider the charging/discharging required power Pb* in calculating the upper-limit driving force Tdlim and the results thereof are identical to each other.

Figure 11:
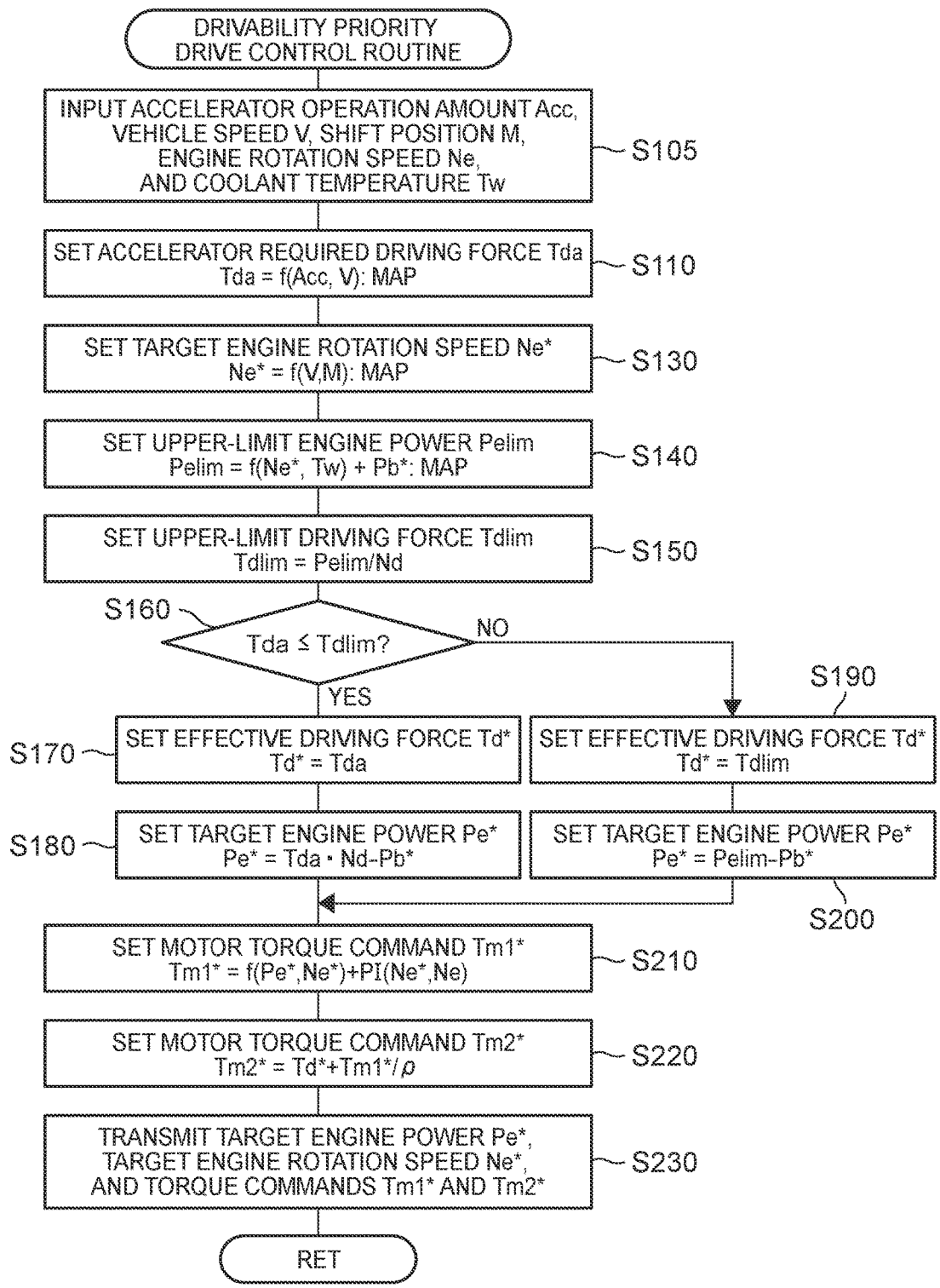
FIG. 11 is a flowchart illustrating an example of the drivability priority drive control routine which is performed by the HVECU 70 when an M position is set.

An operation when the shift position SP is the manual position (M position) in the hybrid vehicle 20 according to the first embodiment will be described below. In this case, the drivability priority drive control routine illustrated in FIG. 11 can be performed. The drivability priority drive control routine illustrated in FIG. 11 is the same as the drivability priority drive control routine illustrated in FIG. 2, except that the process (Step S105) of inputting the shift position M as the shift position SP is added and the process of Step S120 of setting the shift position M using the shift position diagram illustrated in FIG. 6 is excluded. The drive control when the shift position SP is the manual position (M position) will be described below in brief using the drivability priority drive control routine illustrated in FIG. 11.

Figure 3:
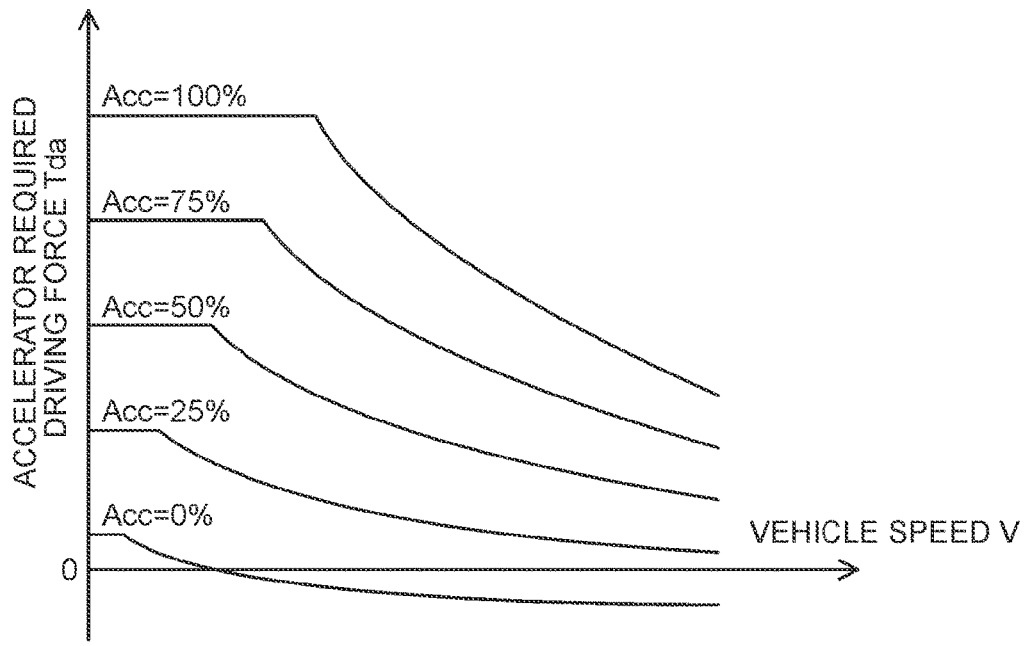
FIG. 3 is a diagram illustrating an example of an accelerator required driving force setting map.
Figure 4:
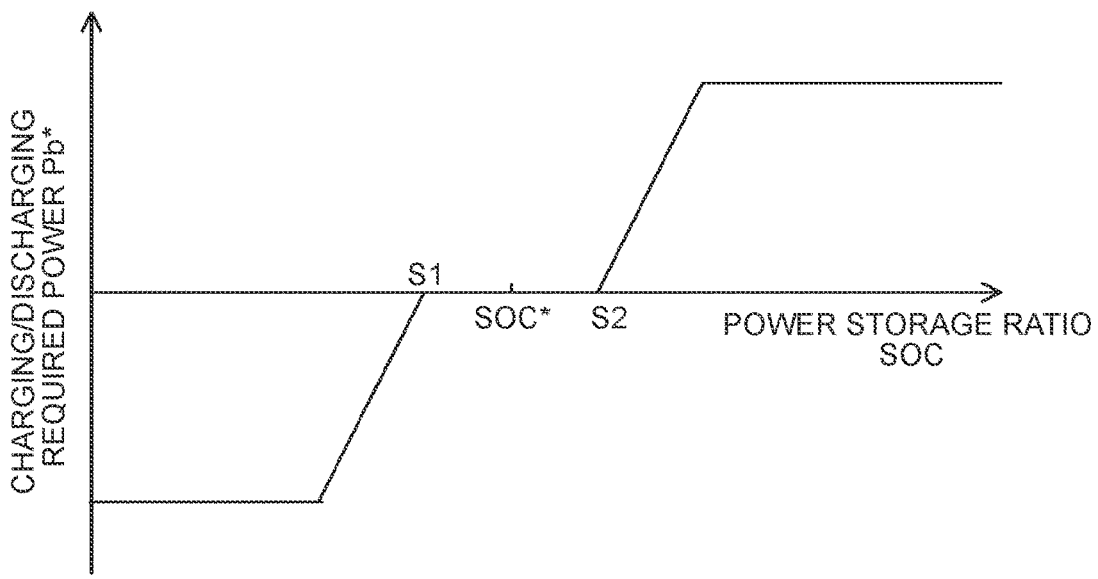
FIG. 4 is a diagram illustrating an example of a charging/discharging required power setting map.

When the drivability priority drive control routine illustrated in FIG. 11 is performed, the HVECU 70 first receives the accelerator operation amount Acc, the vehicle speed V, the shift position M, the rotation speed Ne of the engine 22, and the coolant temperature Tw (Step S105), and sets accelerator required driving force Tda using the received accelerator operation amount Acc, the received vehicle speed V, and the accelerator required driving force setting map illustrated in FIG. 3 (Step S110). Subsequently, the HVECU 70 sets the target engine rotation speed Ne* using the vehicle speed V, the shift position M, and the target engine rotation speed setting map illustrated in FIG. 7 (Step S130), and sets the upper-limit engine power Pelim by adding the charging/discharging required power Pb* to the temporary upper-limit engine power Pelim which is obtained using the target engine rotation speed Ne*, the coolant temperature Tw, the upper-limit engine power setting map illustrated in FIG. 8, and the diagram of FIG. 9 illustrating an example of a relationship between the coolant temperature Tw and the weighting factor k (Step S140). The HVECU 70 sets the upper-limit driving force Tdlim by dividing the upper-limit engine power Pelim by the rotation speed Nd of the drive shaft 36 (Step S150), and compares the accelerator required driving force Tda with the upper-limit driving force Tdlim (Step S160).

When the accelerator required driving force Tda is equal to or less than the upper-limit driving force Tdlim, the accelerator required driving force Tda is set as the effective driving force Td* (Step S170), and a value obtained by subtracting the charging/discharging required power Pb* from a value which is obtained by multiplying the accelerator required driving force Tda by the rotation speed Nd of the drive shaft 36 is set as the target engine power Pe* (Step S180). When the accelerator required driving force Tda is greater than the upper-limit driving force Tdlim, the upper-limit driving force Tdlim is set as the effective driving force Td* (Step S190) and a value obtained by subtracting the charging/discharging required power Pb* from the upper-limit engine power Pelim is set as the target engine power Pe* (Step S200).

Then, the torque command Tm1* of the motor MG1 is set using Expression (2) (Step S210) and the torque command Tm2* of the motor MG2 is set using Expression (3) (Step S220). The target engine power Pe* and the target engine rotation speed Ne* are transmitted to the engine ECU 24, the torque commands Tm1* and Tm2* are transmitted to the motor ECU 40 (Step S230), and the routine ends.

In the above-mentioned hybrid vehicle 20 according to the first embodiment, when the shift position SP is the manual position (M position), similarly to when the shift position SP is the D position in the drivability feeling priority mode, the temporary upper-limit engine power Pelim is set to be less when the coolant temperature Tw is relatively low than when the coolant temperature Tw is relatively high, and the upper-limit driving force Tdlim is set on the basis of the temporary upper-limit engine power Pelim. When the accelerator required driving force Tda is equal to or less than the upper-limit driving force Tdlim, the power for outputting the accelerator required driving force Tda to the drive shaft 36 is set as the target engine power Pe*. When the accelerator required driving force Tda is greater than the upper-limit driving force Tdlim, the power for outputting the upper-limit driving force Tdlim to the drive shaft 36 is set as the target engine power Pe*. Accordingly, when the coolant temperature Tw is relatively low, the upper-limit driving force Tdlim is set to be relatively small, the smaller of the upper-limit driving force Tdlim and the accelerator required driving force Tda is output to the drive shaft 36, and it is thus possible to achieve both giving a good driving feeling to the driver and suppressing a degradation in emissions.

Figure 12:
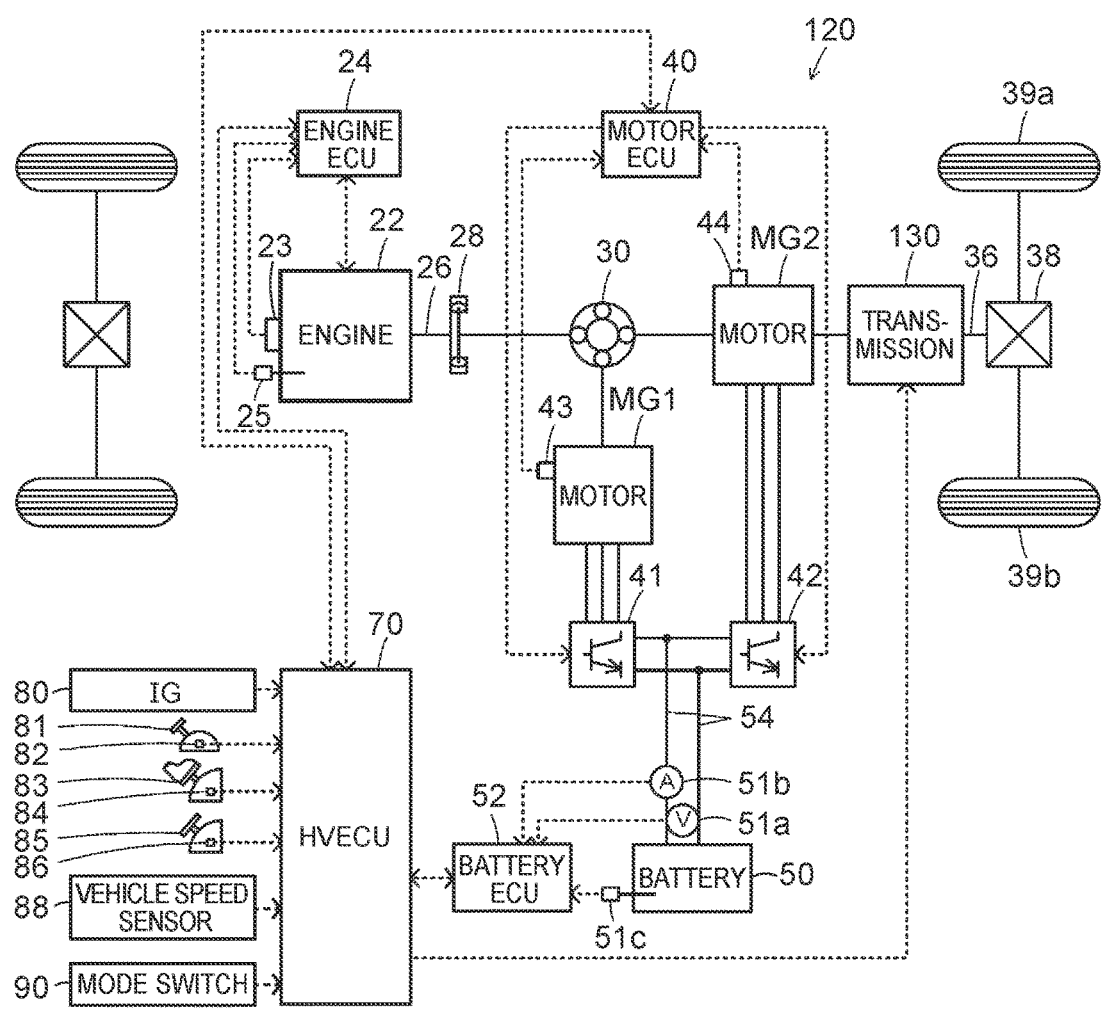
FIG. 12 is a diagram schematically illustrating a configuration of a hybrid vehicle 120 according to a second embodiment.

A hybrid vehicle 120 according to a second embodiment of the disclosure will be described below. The configuration of the hybrid vehicle 120 according to the second embodiment is schematically illustrated in FIG. 12. The hybrid vehicle 120 according to the second embodiment has the same configuration as the hybrid vehicle 20 according to the first embodiment illustrated in FIG. 1, except that a transmission 130 is provided as illustrated in FIG. 12. For the purpose of omission of repeated description, the same elements in the hybrid vehicle 120 according to the second embodiment as in the hybrid vehicle 20 according to the first embodiment will be referenced by the same reference signs and detailed description thereof will not be made.

Figure 13:
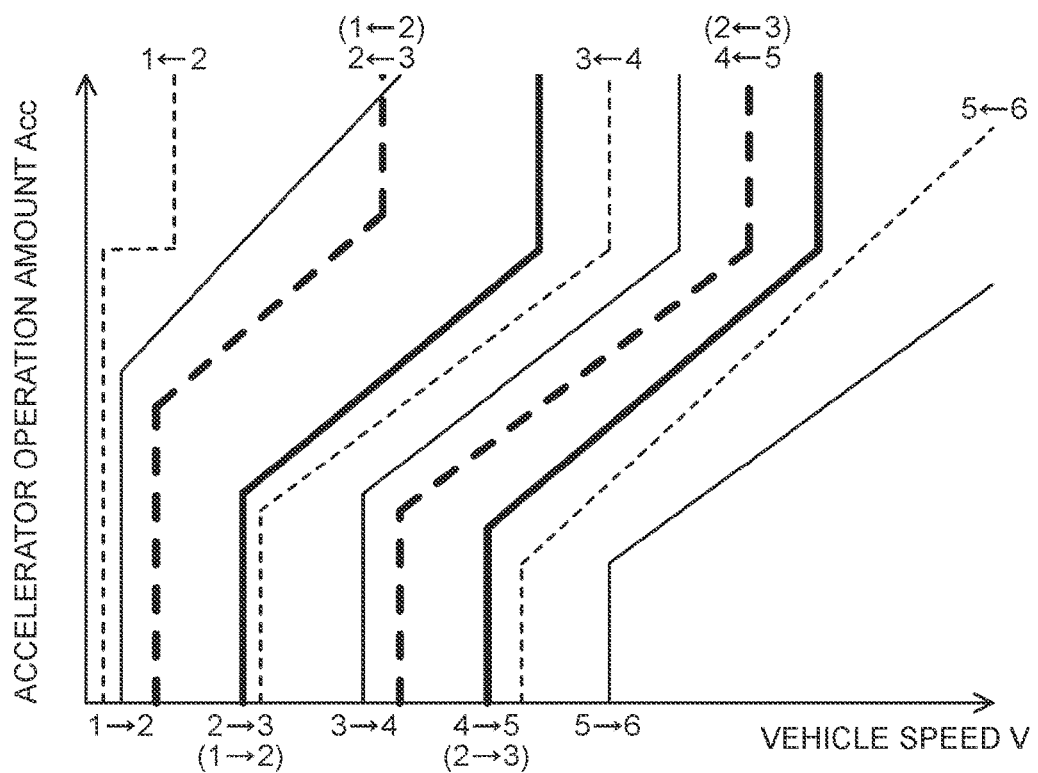
FIG. 13 is a diagram illustrating an example of a shift position diagram which is used in the second embodiment.

The transmission 130 included in the hybrid vehicle 120 according to the second embodiment is constituted by a stepped automatic transmission of three shift positions in the driving direction which is hydraulically driven, and is shifted in accordance with a control signal from the HVECU 70. In the hybrid vehicle 120 according to the second embodiment, three virtual shift positions are set in addition to three shift positions of the transmission 130 to constitute a transmission of six shift positions. FIG. 13 illustrates an example of a shift position diagram which is used in the second embodiment. For the purpose of easy comparison, the shift position diagram illustrated in FIG. 13 is the same as the shift position diagram illustrated in FIG. 6. In FIG. 13, thick solid lines denote upshift lines of the transmission 130 and thick dotted lines denote downshift lines of the transmission 130. Thin solid lines denote virtual upshift lines and thin dotted lines denote virtual downshift lines. In the drawing, numerals and arrows in the upper part and the lower part denote shift of six shift positions including the virtual shift positions, and numerals and arrows in parentheses in the upper part and the lower part denote shift of three shift positions of the transmission 130. As illustrated in the drawing, one virtual shift position is disposed between neighboring shift positions of the transmission 130.

Figure 14:
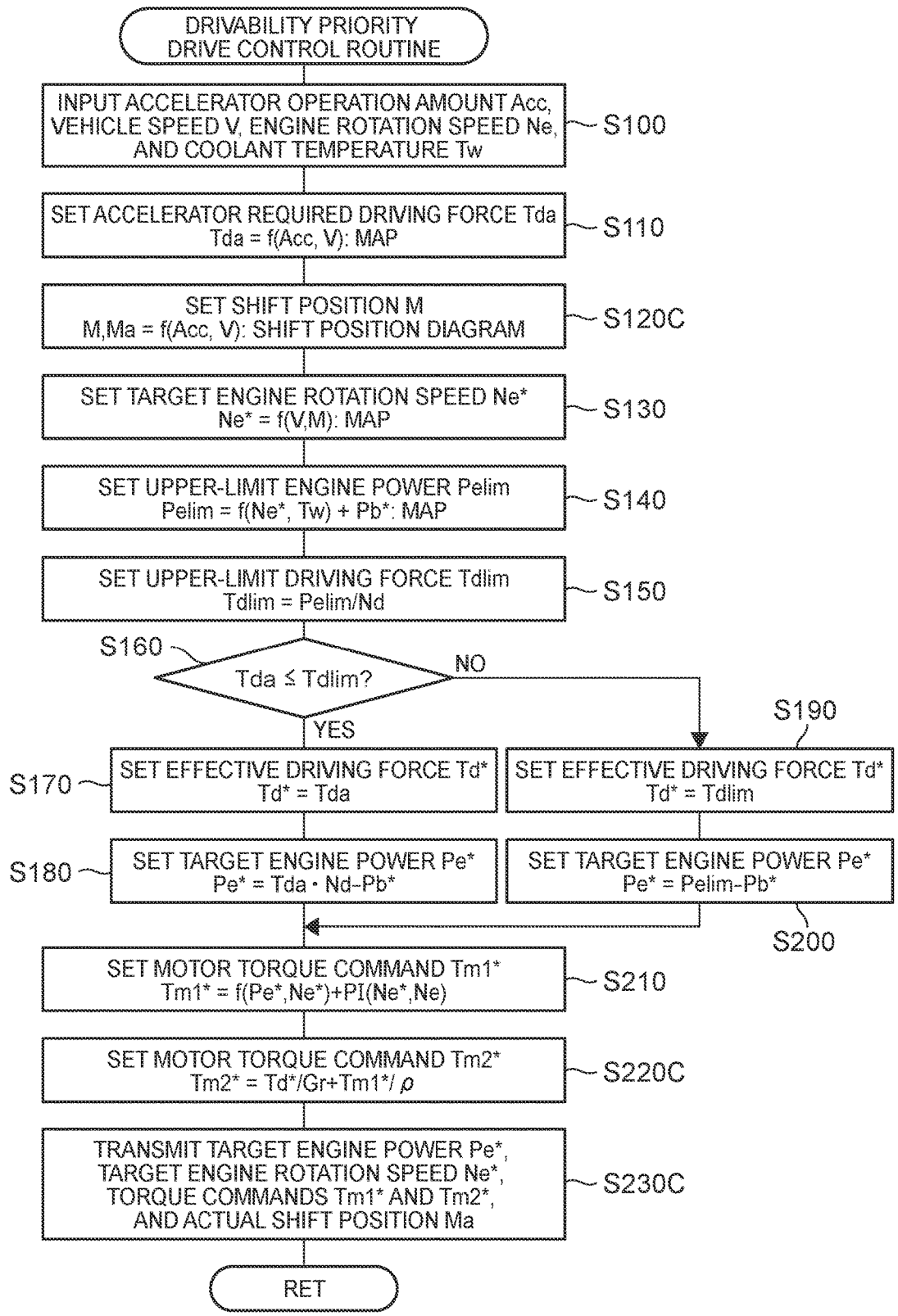
FIG. 14 is a flowchart illustrating an example of a drivability priority drive control routine which is performed by the HVECU 70 when a D position is set in a driving feeling priority mode in the second embodiment.

In the hybrid vehicle 120 according to the second embodiment, when the shift position is the D position in the driving feeling priority mode, the drivability priority drive control routine illustrated in FIG. 14 is performed. The drivability priority drive control routine illustrated in FIG. 14 is the same as the drivability priority drive control routine illustrated in FIG. 2, except for Step S120C of setting an actual shift position Ma as well as the shift position M, Step S220C of setting the torque command Tm2* of the motor MG2 using a gear ratio Gr of the actual shift positions Ma of the transmission 130, and Step S230C of transmitting the actual shift position Ma to the transmission 130 when transmitting the target engine power Pe* or the target engine rotation speed Ne*. Accordingly, the same processes in the drivability priority drive control routine illustrated in FIG. 14 as in the drivability priority drive control routine illustrated in FIG. 2 are referenced by the same step numbers. The drivability priority drive control routine illustrated in FIG. 14 will be described below in brief with a focus on differences from the drivability priority drive control routine illustrated in FIG. 2.

When the drivability priority drive control routine illustrated in FIG. 14 is performed, the HVECU 70 first receives the accelerator operation amount Acc, the vehicle speed V, the rotation speed Ne of the engine 22, the coolant temperature Tw (Step S100), and sets the accelerator required driving force Tda using the accelerator operation amount Acc, the vehicle speed V, and the accelerator required driving force setting map illustrated in FIG. 3 (Step S110). Subsequently, the shift position M and the actual shift position Ma are set using the accelerator operation amount Acc, the vehicle speed V, and the shift position diagram illustrated in FIG. 13 (Step S120C). Here, the shift position M means the six shift positions including the virtual shift positions, and the actual shift position Ma means the three shift positions of the transmission 130. Accordingly, the shift position M is set to any one of the six shift positions on the basis of all shift position lines in FIG. 13, and the actual shift position Ma is set to any one of the three shift positions on the basis of the thick solid line and the thick dotted line in FIG. 13.

Then, the target engine rotation speed Ne* is set using the vehicle speed V, the shift position M, and the target engine rotation speed setting map illustrated in FIG. 7 (Step S130), and the upper-limit engine power Pelim is set by adding the charging/discharging required power Pb* to the temporary upper-limit engine power Pelim which is obtained using the target engine rotation speed Ne*, the coolant temperature Tw, the upper-limit engine power setting map illustrated in FIG. 8, and the diagram illustrating an example of a relationship between the coolant temperature Tw and the weighting factor k in FIG. 9 (Step S140). Then, the upper-limit driving force Tdlim is set by dividing the upper-limit engine power Pelim by the rotation speed Nd of the drive shaft 36 (Step S150) and the accelerator required driving force Tda and the upper-limit driving force Tdlim are compared (Step S160).

When the accelerator required driving force Tda is equal to or less than the upper-limit driving force Tdlim, the accelerator required driving force Tda is set as the effective driving force Td* (Step S170), and a value which is obtained by subtracting the charging/discharging required power Pb* from a value obtained by multiplying the accelerator required driving force Tda by the rotation speed Nd of the drive shaft 36 is set as the target engine power Pe* (Step S180). When the accelerator required driving force Tda is greater than the upper-limit driving force Tdlim, the upper-limit driving force Tdlim is set as the effective driving force Td* (Step S190) and a value obtained by subtracting the charging/discharging required power Pb* from the upper-limit engine power Pelim is set as the target engine power Pe* (Step S200).

Then, the torque command Tm1* of the motor MG1 is set using Expression (2) (Step S210) and torque command Tm2* of the motor MG2 is set using Expression (5) (Step S220C). In Expression (5), "Gr" denotes a gear ratio of the actual shift position Ma of the transmission 130. Accordingly, the first term on the right side of Expression (5) means a driving force to be output to an input shaft of the transmission 130 so as to output the effective driving force Td* to the drive shaft 36 which is an output shaft of the transmission 130.

$$Tm2^* = Td^*/Gr + Tm1^*/\rho \qquad (5)$$

The target engine power Pe* and the target engine rotation speed Ne* are transmitted to the engine ECU 24, the torque commands Tm1* and Tm2* are transmitted to the motor ECU 40, the actual shift position Ma is transmitted to the transmission 130 (Step S230C), and the routine ends. The transmission 130 receiving the actual shift position Ma maintains the shift position when the shift position is an actual shift position Ma, and shifts such that the shift position is an actual shift position Ma when the shift position is not an actual shift position Ma.

In this routine, similarly to the first embodiment, when the coolant temperature Tw is relatively low, the temporary upper-limit engine power Pelim is set to be less than when the coolant temperature Tw is relatively high and the upper-limit driving force Tdlim is set on the basis of the temporary upper-limit engine power Pelim. When the accelerator required driving force Tda is equal to or less than the upper-limit driving force Tdlim, the power for outputting the accelerator required driving force Tda to the drive shaft 36 is set as the target engine power Pe*. When the accelerator required driving force Tda is greater than the upper-limit driving force Tdlim, the power for outputting the upper-limit driving force Tdlim to the drive shaft 36 is set as the target engine power Pe*. Accordingly, when the coolant temperature Tw is relatively low, the upper-limit driving force Tdlim is set to be relatively small, the smaller of the upper-limit driving force Tdlim and the accelerator required driving force Tda is output to the drive shaft 36, and thus it is possible to achieve both giving a good driving feeling to the driver and to suppress a degradation in emissions.

Since the above-mentioned hybrid vehicle 120 according to the second embodiment functions in the same as the hybrid vehicle 20 according to the first embodiment, the same advantages as achieved in the hybrid vehicle 20 according to the first embodiment can be achieved. That is, when the driver steps on the accelerator pedal 83, it is possible to drive the engine 22 at the engine rotation speed Ne based on the vehicle speed V and to give a better driving feeling to the driver in comparison with a case in which the engine rotation speed Ne increases rapidly before the vehicle speed V increases. When the shift position M is changed (shifted), the target engine power Pe* based on the shift position M also changes and it is thus possible to give a feeling of a change in speed to the driver. As a result, it is possible to give a good driving feeling to the driver. When the coolant temperature Tw of the engine 22 is relatively low, the upper-limit power Pelim is set to be less than when the coolant temperature Tw is relatively high. Accordingly, the power output from the engine 22 when the coolant temperature Tw is relatively low is relatively small, and it is thus possible to suppress a degradation in emissions. As a result, it is possible to achieve both giving a good driving feeling to a driver and suppressing a degradation in emissions.

Figure 15:
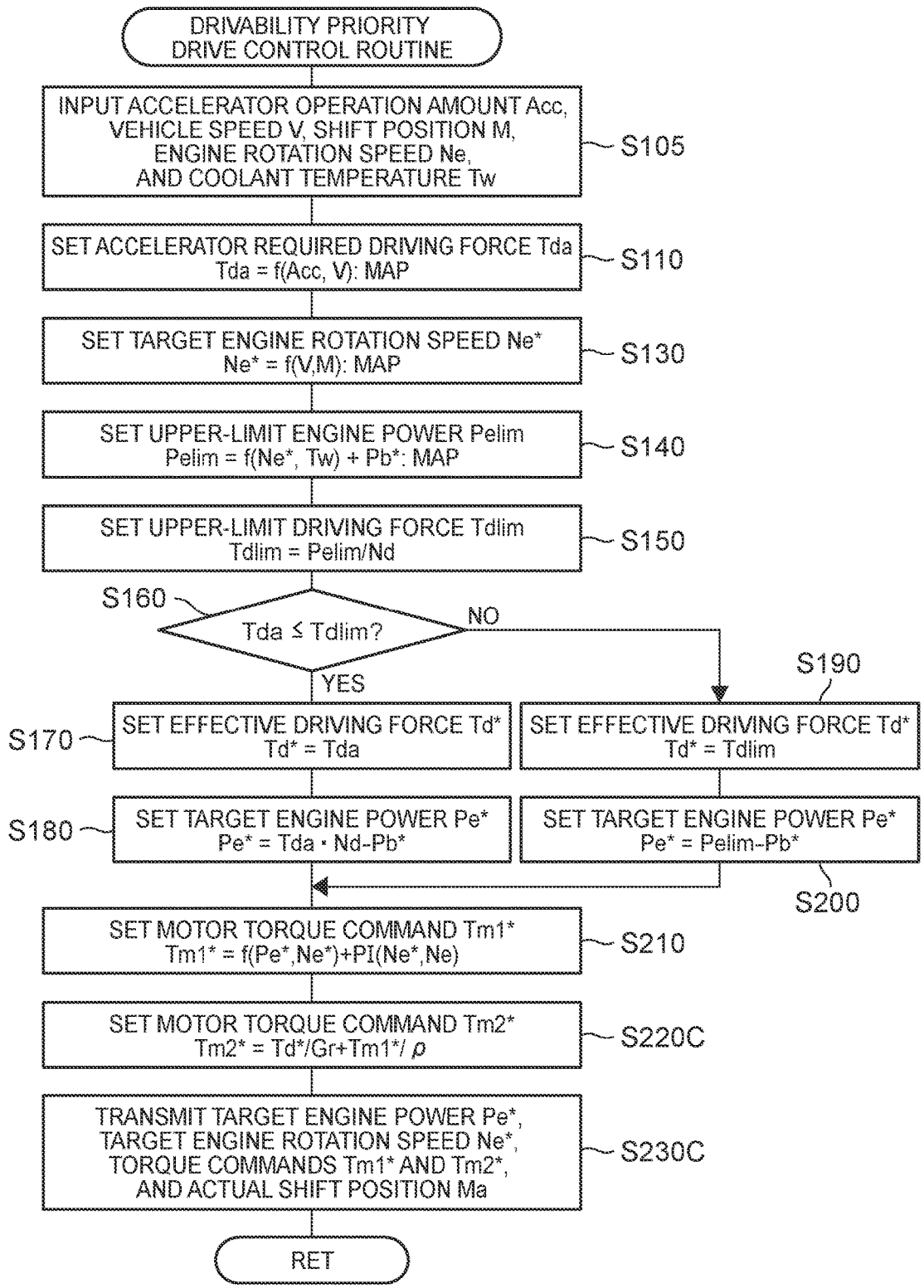
FIG. 15 is a flowchart illustrating an example of the drivability priority drive control routine which is performed by the HVECU 70 when an M position is set in the second embodiment.

An operation when the shift position SP is the manual position (M position) in the hybrid vehicle 120 according to the second embodiment will be described below. In this case, the drivability priority drive control routine illustrated in FIG. 15 can be performed. The drivability priority drive control routine illustrated in FIG. 15 is the same as the drivability priority drive control routine illustrated in FIG. 11, except for Step S220C of setting the torque command Tm2* of the motor MG2 using the gear ratio Gr of the actual shift positions Ma of the transmission 130 and Step S230C of transmitting the actual shift position Ma to the transmission 130 when transmitting the target engine power Pe*, the target engine rotation speed Ne*, or the like. The differences are the same as described in the drivability priority drive control routine illustrated in FIG. 14 and thus description thereof will not be repeated.

In the hybrid vehicle 120 according to the second embodiment, the transmission 130 of three shift positions is provided to constitute six shift positions including the virtual shift positions, but the transmission 130 is not limited to the three shift positions and may have two shift positions or may have four or more shift positions. One virtual shift position is disposed between neighboring shift positions of the transmission, but a desired number of virtual shift positions such as one shift position or second shift positions may be disposed in each shift position of the transmission or a desired number of virtual shift positions may be disposed in only a specific shift position of the transmission. The virtual shift positions may not be provided.

In the embodiments, the engine 22 is an example of the "engine," the motor MG1 is an example of the "first motor," the planetary gear 30 is an example of the "planetary gear mechanism," the motor MG2 is an example of the "second motor," and the battery 50 is an example of the "battery." The HVECU 70, the engine ECU 24, and the motor ECU 40 that perform drive control in the normal driving mode or the drivability priority drive control routine illustrated in FIG. 2 are the example of the "electronic control unit."

The correspondences between principal elements in the embodiments and principal elements of the disclosure described in "SUMMARY" do not limit the elements of the disclosure described in the "SUMMARY," because the embodiments are an example for specifically describing the aspect for putting the disclosure described in the "SUMMARY" into practice. That is, analysis of the disclosure described in the "SUMMARY" has to be performed on the basis of description thereof, and the embodiments are only a specific example of the disclosure described in the "SUMMARY."

While aspect of the disclosure have been described above with reference to the embodiments, but the disclosure is not limited to the embodiments and can be modified in various forms without departing from the gist of the disclosure.

The disclosure is applicable to the industry of manufacturing a hybrid vehicle.

What is claimed is:

1. A hybrid vehicle comprising
an engine,
a first motor,
a planetary gear mechanism including three rotary elements, the three rotary elements being connected to three shafts respectively, the three shafts being an output shaft of the engine, a rotary shaft of the first motor, and a drive shaft connected to an axle,
a second motor configured to input and output power to and from the drive shaft,
a battery configured to exchange electric power with the first motor and the second motor, and
an electronic control unit configured to:
set a required driving force to be output to the drive shaft based on an accelerator operation amount and a vehicle speed;
control the engine, the first motor, and the second motor such that the hybrid vehicle travels using the required driving force;
set a target rotation speed of the engine based on the vehicle speed and a shift position;
set a maximum power output from the engine when the engine operates at the target rotation speed as an upper-limit power;
set a driving force when the upper-limit power is output to the drive shaft as an upper-limit driving force;
set a target engine power such that the smaller of the upper-limit driving force and the required driving force is output to the drive shaft, or such that the smaller of power for outputting the upper-limit driving force to the drive shaft and power for outputting the required driving force to the drive shaft is output to the drive shaft;
control the engine, the first motor, and the second motor such that the hybrid vehicle travels by causing the engine to rotate at the target rotation speed and to output the target engine power; and
set the upper-limit power to be lower when a coolant temperature of the engine is low than when the coolant temperature is high.

2. The hybrid vehicle according to claim 1, wherein the electronic control unit is configured to perform control such that the smaller of the upper-limit driving force and the required driving force is output to the drive shaft to cause the hybrid vehicle to travel.

3. The hybrid vehicle according to claim 1, wherein
the upper-limit power includes a first limit power and a second limit power,
the first limit power is the upper-limit power obtained by applying the target rotation speed to a first relationship, the first relationship is a relationship between the target rotation speed and the upper-limit power,
the second limit power is the upper-limit power obtained by applying the target rotation speed to a second relationship, the second relationship is a relationship between the target rotation speed and the upper-limit power such that the power in the second relationship is higher than the power in the first relationship, and
the electronic control unit is configured to set the upper-limit power to be lower when the coolant temperature is low than when the coolant temperature is high between the first limit power and the second limit power.

4. The hybrid vehicle according to claim 3, wherein
the electronic control unit is configured to set a coefficient to be less when the coolant temperature is low than when the coolant temperature high, and
the electronic control unit is configured to set the upper-limit power to a value obtained by adding a value, that is obtained by multiplying a difference between the second limit power and the first limit power by the coefficient, to the first limit power.

5. The hybrid vehicle according to claim 1, wherein the electronic control unit is configured to set one of the shift position based on an accelerator operation amount and the vehicle speed, and the shift position based on the driver's shifting operation.

6. The hybrid vehicle according to claim 1, wherein the shift position is a virtual shift position.

7. The hybrid vehicle according to claim 1, further comprising a stepped transmission attached between the drive shaft and the planetary gear mechanism,
wherein the shift position is one of a shift position of the stepped transmission and a shift position obtained by adding a virtual shift position to the shift position of the stepped transmission.

* * * * *

UNITED STATES PATENT AND TRADEMARK OFFICE
CERTIFICATE OF CORRECTION

PATENT NO. : 10,040,442 B2
APPLICATION NO. : 15/591822
DATED : August 7, 2018
INVENTOR(S) : Shunya Kato and Masaya Sugai It is certified that error appears in the above-identified patent and that said Letters Patent is hereby corrected as shown below:

In Column 8, Line 4, after "amount" delete "Ace" and insert --Acc--, therefor.

In Column 8, Line 11, after "power" delete "Pedry" and insert --Pedrv--, therefor.

In Column 8, Line 23, after "power" delete "Pedry" and insert --Pedrv--, therefor.

In Column 8, Line 27, after "value" delete "51" and insert --S1--, therefor.

In Column 8, Line 35, delete "Pe* = Pedry – Pb*" and insert --Pe* = Pedrv - Pb*--, therefor.

In Column 11, Line 41, after "Step" delete "5140" and insert --S140--, therefor.

Signed and Sealed this
Second Day of October, 2018

Andrei Iancu
*Director of the United States Patent and Trademark Office*